Figure 1:
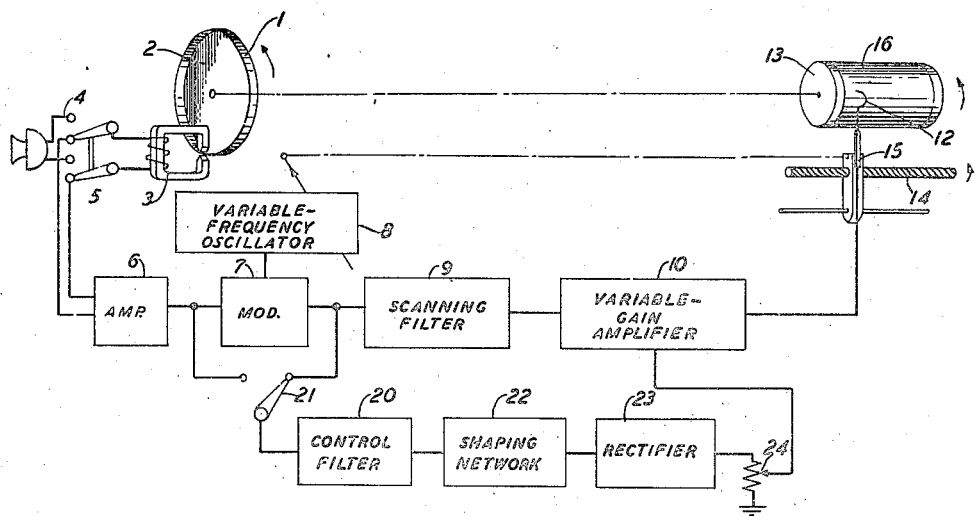

July 16, 1946.  W. KOENIG, JR  2,403,982

ANALYSIS AND REPRESENTATION OF COMPLEX WAVES

Filed Dec. 19, 1944

INVENTOR
W. KOENIG, JR.
BY
N. A. Ewing
ATTORNEY

Patented July 16, 1946

2,403,982

UNITED STATES PATENT OFFICE 2,403,982

ANALYSIS AND REPRESENTATION OF COMPLEX WAVES

Walter Koenig, Jr., Clifton, N. J., assignor to Bell Telephone Laboratories, Incorporated, New York, N. Y., a corporation of New York Application December 19, 1944, Serial No. 568,880

18 Claims. (Cl. 179—1)

The present invention relates to the analysis of complex waves and more especially to novel methods and means for the production of spectrographic representations of complex waves such as speech waves.

It has been proposed heretofore, as disclosed in the copending application of R. K. Potter, Serial No. 438,878, filed April 14, 1942, to represent complex waves in the form of a pattern in which the dimensions of the pattern have substantially the significance of a frequency axis and a time axis, respectively, and in which the representation varies in tone or density or the like from one elemental area to another to depict the varying manner in which the total wave power is distributed across the frequency range occupied by the waves. To form a wave pattern of this character, the wave power found in each of the component frequency bands may be isolated by means of a frequency selector or analyzer and the variation in power in each band then recorded on a sensitized surface or another of a multiplicity of laterally contiguous strip-like portions thereof, each of the strip-like portions being individual to a particular preassigned frequency band.

The definition or detail shown in a spectrographic representation obtained in the manner described is dependent in large measure on the characteristics of the frequency selector. If the latter is sharply selective so that closely adjacent frequency components may be resolved, high "frequency definition" may be obtained in the spectrographic representation, i. e., these closely adjacent components may be made to appear separately and distinctly in the pattern. With respect to definition in the other coordinate direction across the pattern, it is found that the more sharply selective the frequency selector is made, the greater is the tendency of the selector to obscure rapid changes in the wave power. Thus, if there be an abrupt change in the wave power appearing in a given component frequency band, the change will tend to appear in the representation as a gradual change, thereby impairing the "time definition."

One of the objects of the present invention is to achieve improved definition in the spectrographic representation of complex waves. A related object is to achieve improved resolution in the analysis of speech waves or the like.

Another factor bearing on the amount and clarity of detail shown in a spectrographic representation of complex waves is the relation between the range of variation of the power content of the selected components and the range that can be accommodated by the sensitized surface. In speech waves, for example, the wave power appearing in a component frequency band may vary over a range of more than 35 decibels whereas the sensitized surface may be incapable of representing, by gradations in density for example, recording effects that vary over an intensity range of more than 10 decibels. In such case, the speech wave components of low power content may quite fail to record, or if all components are recorded, the stronger ones above a certain power level will all appear in the pattern to be of the same strength, and both the time resolution and the frequency resolution will be impaired. Partial accommodation can be effected by first passing the complex waves through a fixed network that discriminates in favor of the frequency bands that ordinarily carry the least wave power. Further improvement can be obtained by applying each selected band to an amplitude compressor, which reduces differences in the relative strengths of the several components. An amplitude compressor, however, is incapable of discriminating between a significant wave component of low power content and circuit noise or other insignificant effects of low power content, and it tends to impair the effective frequency resolution.

Another object of the invention is to accommodate a wide variation in the power content of the selected frequency bands to the lesser range of a sensitized surface on which a visual representation of complex waves is to be made to appear, and more especially to effect the accommodation with minimum loss of definition.

In accordance with a feature of the present invention, the intensity level and/or range of variation of the recording effect derived from the wave power found in each selected frequency band is automatically regulated under the influence of wave power lying outside of the selected band. More particularly, in accordance with embodiments of the invention herein disclosed, the regulation of the intensity of the recording effect is made dependent upon the wave power appearing either in substantially the entire complex wave or in a subdivision of the occupied frequency range that embraces the selected frequency band. In certain embodiments, regulation is effected by passing the selected band of waves through an amplifier the gain of which is continuously and automatically varied under the control of the wave power lying in the wider frequency band. In other embodiments, the wider band of waves is passed through an amplitude compressor before the narrower band of waves is selected therefrom.

Figure 2:
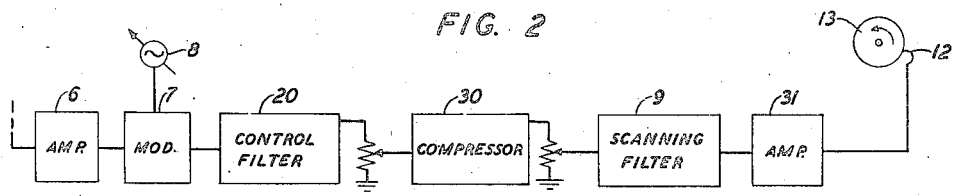
Figure 3:
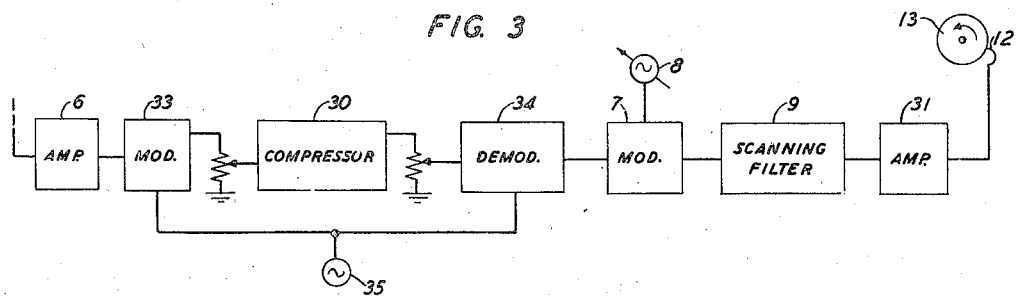

The nature of the present invention and its various features, objects and advantages will appear more fully from a consideration of the embodiments illustrated in the accompanying drawing and hereinafter to be described in detail. In the drawing:

Fig. 1 illustrates schematically a spectrographic recording system employing automatic gain control, in accordance with the invention; and Figs. 2 and 3 illustrate schematically other embodiments utilizing amplitude compression.

Referring more particularly now to the speech pattern recording system illustrated in Fig. 1, there is included a magnetic recorder-reproducer shown diagrammatically as comprising an endless magnetic tape 1 mounted on the periphery of a continuously rotating drum 2, and an electromagnet comprising coil 3 on a magnetic core that is disposed in recording or pick-up relation with the tape 1. The speech-bearing waves of which a pattern is to be formed are derived in the form of electrical waves from a microphone circuit 4 which can be connected at will to coil 3 by means of a switch 5. After the waves have been recorded on the magnetic tape 1, switch 5 can then be closed to its lower contact and the recorded waves will be reproduced electrically, or played back, repeatedly, once for each complete rotation of the drum 2.

The waves so reproduced are passed through an amplifier 6 to a frequency analyzer or scanner of the heterodyne type comprising a modulator 7, which is supplied with beating oscillations from an oscillator 8, and a band-pass or scanning filter 9 which is connected to receive the wave output from modulator 7. Modulator 7 effectively translates the applied band of speech-bearing waves to a higher position in the frequency range depending on the frequency of the beating oscillations, and the latter frequency is varied continuously from one limiting value to another such that the translated band progressively shifts in frequency position. The total shift of the band is comparable with its width. Scanning filter 9 has a relatively narrow pass band, the mean frequency of which is such that as the translated band of waves shifts in frequency, filter 9 selects progressively different component frequency bands therefrom. In effect, the pass band of filter 9 moves gradually across the frequency range occupied by the speech-bearing waves and admits the wave components appearing in the different bands. The waves selected by filter 9 are passed through an amplifier 10, the gain of which is varied in a manner and for a purpose to be described, to marking stylus 12 of the pattern recorder.

The pattern recorder is illustrated diagrammatically in Fig. 1 as comprising a cylindrical metal drum 13 that is rotated in synchronism with the drum 2 of the magnetic recorder-reproducer, and a rotating threaded shaft 14 on which rides a traveling nut 15 that carries the stylus 12. A strip 19 of dry facsimile paper, preferably one with a titanium oxide coating and carbon backing, such as the "Teledeltos Grade H" facsimile paper developed by the Western Union Telegraph Company, is wrapped around the cylindrical surface of the drum 13. Stylus 12, which may be a stainless steel wire 10 mils in diameter, for specific example, bears lightly against the sensitized or recording surface of the facsimile paper and in the course of the production of a spectrogram it is driven slowly across the paper, i. e., longitudinally of drum 13. Whenever wave power is encountered by the frequency scanner, corresponding currents pass through stylus 12 and through the facsimile paper to the metal drum. By virtue of the heat generated locally at the point of contact of stylus 12, a chemical change takes place and a mark is made on the paper, the darkness or density or blackness of the mark depending on the current strength and therefore also on the power content of the selected band of waves. The progressive change in the operating frequency of oscillator 8 is electrically or mechanically geared with the progressive change in the position of stylus 12 so that as the stylus moves once across the facsimile paper the oscillator frequency progresses from its one limiting value to the other. This latter operation is completed only after many rotations of the drum 13. In one instance in practice, for example, in which a 3500-cycle band of speech waves was to be recorded, the parts were so arranged that drum 13 rotated 200 times, and the complex waves were reproduced 200 times, while stylus 12 moved across the facsimile paper.

Disregarding the slight change in the frequency of oscillator 8 that takes place during each reproduction of the speech waves, and the corresponding slight change in the frequency band selected by filter 9, it will be noted that during each reproduction of the recorded waves the filter 9 selects a definite predetermined frequency band while the stylus 12 traverses a respectively corresponding path substantially longitudinally of the facsimile paper, i. e., circumferentially of the drum 13. Along each such path the stylus leaves a trace the blackness of which tends to vary along its length more or less as the power content of the respectively corresponding band of waves selected by filter 9 varies in the course of the reproduction. Inasmuch as the several traces are substantially contiguous to each other, the complete pattern has the appearance of a half tone picture. Each elemental area thereof is individual to a preassigned frequency band and predetermined time interval.

The progressively different bands selected by filter 9 may overlap each other to a very considerable extent, depending on the ratio of the band width of filter 9 to the change in frequency of oscillator 8 from one reproduction to the next. One ratio may be preferred to another depending on the use to which the spectrogram is to be put. If the band width of filter 9 is 45 cycles or less, for example, fairly high frequency definition may be obtained. For other purposes such definition may be regarded as unnecessary or even distracting, or it may be preferred to compromise in favor of greater time definition. For such other purposes the scanning filter 9 may have a pass band that is of the order of 300 cycles wide, for specific example, or wide enough to embrace several successive harmonics of the fundamental voice frequency. These two rather different conditions, depending on the band-width of the scanning filter, will be referred to as narrow band scanning and wide band scanning, respectively.

In accordance with the present invention, the Fig. 1 system includes a control circuit for automatically regulating the gain of amplifier 10. The control circuit includes a filter 20, which by means of a switch 21 may be bridged across the output circuit of modulator 7, an optional shaping network 22, and a rectifier 23 which produces from the waves passed by filter 20 a variable unidirectional gain-controlling voltage. Control filter 20 may have substantially the same mean pass frequency as the scanning filter 9, but the width of its pass band is substantially greater than that of filter 9, preferably at least several times as great. In one example in practice, scanning filter 9 had a pass band 45 cycles wide and control filter 20 had a pass band about four times as wide. The gain controlling voltage, which is made to appear across a potential divider 24, varies in accordance with the effective intensity or power content or envelope amplitude of the band of waves applied to the rectifier 23. All or any desired part of the unidirectional voltage is applied to amplifier 10 to regulate the gain thereof and in such sense as to restrict the variations in the intensity of its wave output. Gain-regulated amplifiers of the kind described are well known in the art and it is therefore deemed unnecessary to enter upon a detailed description of a specific example.

The gain controlling voltage appearing at potential divider 24 depends not only on the power content of the particular frequency band passed by filter 9, but also on the power content of adjacent frequency bands within the pass band of filter 20. If the power content of the wider band is high, the voltage controlling the gain of amplifier 10 will be large and the gain of the amplifier will thereby be reduced, irrespective of the power content of the narrower band. If, on the other hand, there is little or no wave power in the wider band, the amplifier 10 will operate at substantially maximum gain, so that such speech wave power as may be present in the narrower band will be brought within the limited recording range of the facsimile paper. The reduction in intensity range afforded by the gain controlled amplifier 10 may be supplemented if desired by introducing a limited amount of amplitude compression.

With regard to the effect of the control circuit on resolving power and pattern definition, it is important to note certain essential differences between the characteristics of voiced sounds and unvoiced sounds. In vowels and other voiced sounds there is wave power at substantially each harmonic of the fundamental voice frequency, and one or a few groups of successive harmonics carry most of the wave power. In unvoiced sounds, such as most of the consonants, the total wave power content is relatively small and it is distributed more nearly uniformly throughout the frequency range. When a strong harmonic associated with a voiced sound is selected by scanning filter 9 in the course of narrow band scanning, the same strong harmonic and also adjacent harmonics are passed by control filter 20 and cause the gain of amplifier 10 to be reduced in the desired manner. When filter 9 reaches a frequency interval between such harmonics, on the other hand, the various adjacent harmonics are still passed by control filter 20 and the gain of the amplifier 10 remains reduced. This insures that substantially no mark is recorded on the facsimile paper and leaves well defined open spaces between the adjacent harmonics on the spectrogram. Finally, when an unvoiced sound is encountered, and all of the speech components passed through filter 9 are therefore relatively feeble, the control circuit also receives little wave power and it accordingly increases the gain of amplifier 10 enough to allow the feeble selected components to be recorded on the facsimile paper.

Thus, the control circuit virtually recognizes whether a region of low power level encountered by filter 9 is associated with the substantially blank interval between the harmonics of a voiced sound, which should be suppressed in the pattern, or whether it is a part of a feeble unvoiced sound and therefore to be strengthened and recorded.

Whether filters 9 and 20 be designed for narrow band scanning or wide band scanning, the shaping network 22 may be interposed between the control filter and rectifier 23 to give greater or less weight to the various frequencies within the range passed by the control filter 20.

Where wide band scanning is desired, however, it is preferred to use substantially the entire speech band for control purposes. Switch 21 is therefore arranged to bridge control filter 20 across the output circuit of amplifier 6 when desired, and the filter 20 itself should in this case be designed to pass all or a substantial part of the speech frequency range to be recorded. The wide band scanner resolves, not the individual harmonics, but the several groups or bands of successive harmonics that characterize voiced sounds, and the control circuit serves, in part, to prevent marks being made in areas of the pattern that represent the inter-group frequency intervals of such sounds. The shaping network 22 is designed again to fix the weight given to the various frequency components in producing the gain-controlling voltage. Spectrograms with improved detail in the upper bands of some of the vowels have been obtained by use of a shaping network that relatively attenuates the very low speech frequencies. It is entirely feasible, however, to omit both the shaping network 22 and filter 20.

Fig. 2 illustrates schematically a modification of the Fig. 1 system. As in Fig. 3, corresponding parts are assigned the same reference numbers. In this embodiment, the control filter 20 follows modulator 7 in circuit sequence and its wave output is applied through a potential divider to an amplitude compressor 30. The latter in turn is connected through another potential divider to scanning filter 9 which leads through an amplifier 31 of fixed gain to the recording stylus 12. With the parts proportioned for narrow band scanning, the improvement in definition is similar to that obtained with the Fig. 1 system.

Compresssor 30, by virtue of its non-linear characteristic, discriminates markedly in favor of applied waves of low energy content. Hence, when a vowel sound is encountered by control filter 20, compressor 30 relatively impedes wave transmission because of the presence of relatively strong harmonics. This effect is desirable whether scanning filter 9 is to pass one of the harmonics or a band between harmonics, for in the one case the intensity of the selected component is reduced to within the scale of the facsimile paper and in the other case the insignificant energy between harmonics is prevented from recording. When control filter 20 encounters an unvoiced sound, on the other hand, the absence of substantial wave power within the filter band allows compresssor 30 to discriminate in favor of the selected waves, and to raise the intensity level of the band passed by filter 9 to within the recording range of the facsimile paper. The degree of compression afforded by compressor 30 can be controlled by adjusting the potential divider that precedes it. The potential divider that follows it can be used to adjust the average intensity of the marking current supplied to the stylus 12.

The principles described with reference to Fig. 2 may be applied to wide band scanning in the manner shown in Fig. 3. In Fig. 3, the entire band of speech waves received from amplifier 6 is translated to a fixed higher frequency range by means of a modulator 33 supplied with beating oscillations of constant frequency from oscillator 35. The translated waves are applied through a potential divider to compressor 30 which operates to relatively impede wave transmission more or less in proportion to the total wave power impressed upon it. The compressed waves are then restored to their original speech frequencies by means of demodulator 34 which is supplied with beating oscillations from source 35. So restored, the waves are subjected to frequency scanning as before by means of elements 7, 8 and 9, and the progressively changing selected band of waves is applied through amplifier 31 to recording stylus 12 as in Fig. 2.

Amplitude compression of the order of that produced by compressor 30 in Figs. 2 and 3 generates distortion products which, if they fall within the pass band of the scanning filter 9, impair definition. In Fig. 2, the pass band of filter 20 is sufficiently narrow in relation to the mean frequency thereof that the unwanted products of compression fall outside the selected frequency range. Similarly in Fig. 3, the elevation of the speech band to a high frequency range prior to compression tends to restrict the generated modulation products to frequencies outside the translated speech band. Modulation products are generated also in the Fig. 1 system by reason of the rapid variation in the gain of amplifier 10 but, inasmuch as these products are generated at a point following the selection of the wave components to be recorded, the resulting redistribution of the selected wave power does not substantially affect the mark made by the stylus 12.

Although the present invention is in some respects peculiarly adapted for the analysis of speech bearing waves and has been described largely in terms of such use, it will be understood from the foregoing exposition of the principles that are involved that the invention is applicable also to the analysis of other complex waves. Thus, in any case, the control circuit may virtually examine enough of the frequency spectrum of the waves being analyzed to recognize major changes in the character of the spectrum and automatically modify the variations in the selected wave components accordingly in a manner depending on the differences that are to be emphasized or suppressed. The invention may be embodied in various forms, in addition to those herein illustrated and described, within the spirit and scope of the appended claims.

What is claimed is:

1. In combination, a source of complex waves, frequency analyzer means for deriving from each of successively different parts of the frequency range occupied by said waves an effect individual thereto that varies in intensity in dependence on the variations in wave power found in the individually corresponding part of the frequency range, and means for altering the range of variations in the intensity of said derived effect including means for modifying the intensity of each said effect in dependence on the amount of wave power found at frequencies lying outside the said individually corresponding part of the frequency range.

2. In combination, a source of speech-bearing waves, frequency analyzer means for deriving from each of successively different parts of the frequency range occupied by said waves an effect individual thereto that varies in intensity in dependence on the variations in wave power found in the individually corresponding part of the frequency range, and means for restricting the range of variations in the intensity of each said effect in dependence upon the wave power found within a wave frequency range that is substantially wider than the part of the frequency range from which the said effect is derived.

3. In combination, a source of speech-bearing waves, means for deriving from said waves effects that vary in intensity in correlation with the variations in effective intensity of the wave components lying within respectively corresponding, successively different parts of the frequency range occupied by said waves, and means for restricting the range of variations in the intensity of each said effect in dependence on the effective intensity of any wave components lying within a part of the frequency range which is substantially wider than, and which includes, the particular part to which the said effect is respective.

4. In combination, a source of speech-bearing waves, means for selecting from each of a multiplicity of successively different parts of the frequency range occupied by said waves any wave components lying therein, the frequency extent of each said part of the frequency range being of the order of the fundamental voice frequency, a wave transducer connected to receive the wave components selected from any particular part of the frequency range, means for concurrently selecting any wave components appearing in a frequency band that is several times wider than the said particular part of the frequency range and that embraces said particular part, means for deriving from said last-mentioned selected component an effect the intensity of which is correlated with the varying effective intensity of said last-mentioned component, and means for varying the transmission equivalent of said transducer under the control of said derived effect in such sense that the transmission equivalent increases with an increase in the intensity of the said derived effect.

5. In combination, a recording of speech-bearing waves, means for repeatedly reproducing the recorded waves, frequency translating means for progressively changing the position of the frequency range occupied by the reproduced waves, means including filter means connected to receive the translated waves for deriving from the said waves an effect that in the course of each reproduction varies in intensity in correlation with the varying effective intensity of the waves lying in a predetermined component frequency band, frequency selective means for concurrently selecting from the said translated waves a band of waves that is several times wider than the said band selected by said filter means, and means for relatively increasing the intensity of the derived effect whenever the effective intensity of said wider band of waves is relatively low.

6. In combination, a recording of speech-bearing waves, means for repeatedly reproducing the said recorded waves, means for selecting on successive reproductions of the said waves progressively different component frequency bands, means for deriving from each selected band an effect that varies in intensity in correlation with the variations in the wave power content of the selected band, means for producing a variable density record of the varying intensity of the derived effect respective to each band, and means for increasing the relative intensity of the said derived effect whenever the power content of said speech-bearing waves is relatively low.

7. In combination, a recording of speech-bearing waves, means for repeatedly reproducing the recorded waves, a wide-band frequency scanner connected to receive the reproduced wave, said frequency scanner comprising frequency selective means for selecting progressively different frequency bands during successive reproductions, a wave transducer connected to receive the selected waves from said frequency scanner, and means responsive to variations in the effective intensity of the reproduced waves for automatically varying the transmission equivalent of said transducer, said last-mentioned means being operative to increase the relative intensity of the selected waves whenever the effective intensity of the reproduced waves is relatively low.

8. A combination in accordance with claim 7 including means responsive to the waves passed by said transducer for recording the variations in effective intensity thereof.

9. In combination with a source of speech-bearing waves, means for selecting successively different frequency bands from said waves, means operative on the wave components appearing in each selected band for varying the relative intensity level thereof, said last-mentioned means comprising means responsive to variations in the effective intensity of said speech-bearing waves for varying the said relative intensity level oppositely to the said variations in effective intensity.

10. In combination, a source of speech-bearing waves, a record surface, means for separately selecting the wave components appearing in each of a multiplicity of subdivisions of the frequency range occupied by said waves, means actuated by the selected wave components for producing on said record surface a variable density recording of the variations in wave power content of each said subdivision, and means respective to variations in the wave power content of the said frequency range for reducing the range of variation in the power content of the selected components.

11. A combination in accordance with claim 10, in which said responsive means is operative directly on the selected components.

12. In combination, a source of complex waves, means for selecting from said waves the wave components lying in each of successively different frequency bands, and means for varying the intensity level of the selected components lying in any of said bands under the control of the wave components lying in a different band.

13. In combination, a source of complex waves, means for selecting from said waves the wave components lying in each of successively different frequency bands, means for subjecting the selected wave components lying in each frequency band to amplitude compression, and means for selecting from the compressed components the wave components lying within a predetermined part of the band.

14. In combination, a source of speech-bearing waves, means for selecting from said waves the wave components lying in each of a multiplicity of successively different frequency bands, each of said bands being wide enough to embrace a plurality of successive harmonics of the fundamental speech frequency, means for subjecting the wave components lying in any of said frequency bands to amplitude compression, means for selecting from the compressed wave components derived from any of said frequency bands a component band of waves that is at least several times narrower than the said first-mentioned band, and means responsive to the last-mentioned selected band of waves for visually representing the variations in power content thereof.

15. A combination in accordance with claim 14 including means for differently weighting the different components within the wider of said bands of waves.

16. In combination, a recording of speech-bearing waves, means for repeatedly reproducing the said waves in electrical form, frequency selective means for selecting progressively different frequency bands during successive reproductions of said waves, means for subjecting the waves lying in the selected band to amplitude compression, means for selecting a substantially narrower frequency band from the compressed waves, and means for recording the variations in effective intensity of the wave component lying in each last-mentioned selected band in respective laterally adjacent strip-like portions of a record surface.

17. In combination, a source of complex waves that occupy a superaudible frequency range, means for subjecting the waves from said source to amplitude compression, means for translating the compressed waves to a lower frequency position, and means for selecting successively different component frequency bands from the translated waves.

18. In combination, a source of speech-bearing waves, means for translating said waves to an elevated position in the frequency range, means for subjecting the translated waves to amplitude compression, means for translating the compressed waves to a lower frequency range, means for selecting successively different frequency bands from the said waves translated to said lower frequency range, and means responsive to the wave components lying in each of the selected frequency bands for visually representing the variations in the intensity thereof.

WALTER KOENIG, Jr.